(12) United States Patent
Wong et al.

(10) Patent No.: US 7,576,461 B2
(45) Date of Patent: Aug. 18, 2009

(54) ELECTRIC MOTOR

(75) Inventors: Ben To Fan Wong, Hong Kong (CN); Hok Koon Chan, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 356 days.

(21) Appl. No.: 11/433,461

(22) Filed: May 15, 2006

(65) Prior Publication Data

US 2006/0261692 A1    Nov. 23, 2006

(30) Foreign Application Priority Data

May 17, 2005    (GB) .................................. 0509982.5

(51) Int. Cl.
*H02K 5/00* (2006.01)
(52) U.S. Cl. .............................. 310/89; 310/71; 310/239
(58) Field of Classification Search ............. 310/42–43, 310/71, 89, 239
See application file for complete search history.

(56) References Cited

U.S. PATENT DOCUMENTS

| | | | | |
|---|---|---|---|---|
| 4,593,217 A | * | 6/1986 | Levine | 310/90 |
| 4,847,528 A | * | 7/1989 | Eguchi et al. | 310/239 |
| 5,015,155 A | * | 5/1991 | Brown | 417/360 |
| 5,268,607 A | * | 12/1993 | McManus | 310/89 |
| 5,767,596 A | * | 6/1998 | Stark et al. | 310/89 |
| 5,886,436 A | * | 3/1999 | Schneider et al. | 310/89 |
| 6,404,086 B1 | * | 6/2002 | Fukasaku et al. | 310/89 |
| 6,713,916 B1 | | 3/2004 | Williams et al. | |

FOREIGN PATENT DOCUMENTS

| | | |
|---|---|---|
| DE | 41 06 672 A1 | 9/1992 |
| DE | 297 07 760 U1 | 4/1998 |
| EP | 0 948 115 A2 | 10/1999 |
| GB | 2 163 298 A | 2/1986 |
| JP | 8-223849 A | 8/1996 |
| JP | 10-32952 A | 2/1998 |

* cited by examiner

*Primary Examiner*—Thanh Lam
(74) *Attorney, Agent, or Firm*—Birch, Stewart, Kolasch & Birch, LLP

(57) ABSTRACT

The electric motor is a fitment to a customer's unit and in particular to a customer's electronic throttle control unit. The motor comprises a can-like metal housing 10 having one or more outwardly extending flanges 21, 22 and an end cap 15 closing the open end 12 of the housing 10. The end cap 15 comprises a plastic inner part 16 which fits within the open end of the housing 10 and which supports motor terminals 17 and brush gear 18 for the motor. The end cap 15 also comprises a metal outer part 20 which has one or more portions 29, 30 extending over the flange or flanges 21, 22 of the housing. The flange(s) of the metal housing and the aforesaid portion(s) of the metal outer part of the end cap 15 have apertures 24, 32 for receiving fastening members whereby the motor can be connected to the customer's unit.

8 Claims, 3 Drawing Sheets

US 7,576,461 B2

ELECTRIC MOTOR

CROSS REFERENCE TO RELATED APPLICATIONS

This non-provisional application claims priority under 35 USC § 119(a) from patent application Ser. No. 0509982.5 filed in Great Britain on May 17, 2005.

BACKGROUND OF THE INVENTION

This invention relates to an electric motor for fitment to a customer's unit particularly, but not exclusively, an electronic throttle control unit and to a method of fitting such an electric motor to a customer's unit.

Present motor designs for fitment to a customer's unit in the form of an electronic throttle control unit comprise a can-like metal housing and a plastic holder fitting in the open end of the housing and supporting motor terminals and brush gear. A metal mounting plate is then laser welded to the rim around the open end of the metal housing. The mounting plate is then connected to the body of the customer's unit by threaded fasteners with the can-like housing of the motor extending into a hollow space in the body of the control unit.

Motors used in electronic throttle control units suffer a lot of vibration with the result that the aforesaid laser welded connection between the mounting plate and the rim of the housing has been known to work loose during vibration testing carried out by the customer.

BRIEF SUMMARY OF THE INVENTION

According to a first aspect of the present invention, there is provided an electric motor for fitment to a customer's unit, comprising a can-like metal housing having one or more outwardly extending flanges and an end cap closing the open end of the housing, the end cap comprising a plastic inner part which fits within the open end of the housing and which supports motor terminals and brush gear for the motor and a metal outer part which has a portion or portions extending over the flange or flanges of the housing, said flange(s) of the metal housing and said portion(s) of the metal outer part of the end cap each having a plurality of apertures for receiving fastening members whereby the motor can be connected to the customer's unit.

Preferably, the plastic inner part of the end cap is fixed to the metal outer part of the end cap by two plastic posts integral with the plastic inner part and passing through apertures in the metal outer part.

Preferably, the metal outer part of the end cap has at least two arcuate depressions which are a press fit in the open end of the can-like housing.

Preferably, the inner part of the end cap supports one or more suppression elements.

According to a second aspect of the present invention, there is provided an electronic throttle control unit comprising a body having a recess and an electric motor according to the first aspect of the invention fitted to the unit by fastening members extending through the apertures in said flange(s) of the metal housing and said portion(s) of the metal outer part of the end cap and engaging with the body of the unit and with the can-like metal housing extending into the recess in the body.

The foregoing and other aspects will become apparent from the following detailed description of the preferred embodiment when considered in conjunction with the accompanying drawings.

DETAILED DESCRIPTION OF THE PREFERRED EMBODIMENT

Figure 1:
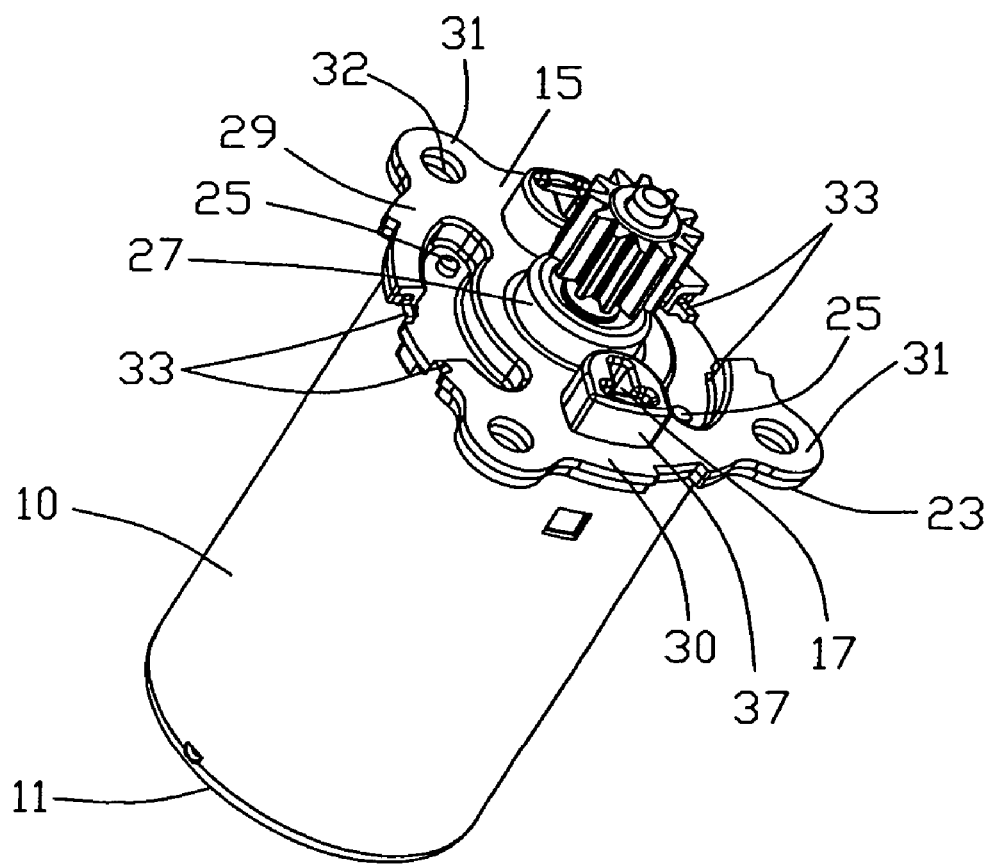
FIG. 1 is a perspective view of one embodiment of an electric motor according to the present invention.

In the various Figures, like parts are referred to by like numbers.

Referring now to the drawings, there is shown therein an electric motor in the form of a PMDC micromotor for fitment to a customer's unit particularly in the form of an electronic throttle control unit having a body (not shown) defining a cavity or recess (not shown) for receiving the motor.

The motor comprises a can-like metal housing 10 supporting a pair of arcuate magnets 39 and having a closed end 11 and an open end 12. The closed end 11 supports a bearing for a rotor 14 of the motor. The open end 12 of the housing 10 is closed by an end cap 15 comprising a plastic inner part 16 and a metal outer part 20. The plastic inner part 16 fits within the open end of the housing 10 and supports motor terminals 17, brush gear 18 and suppression elements 19.

The can-like metal housing 10 has two outwardly extending flanges 21 and 22 which are formed as an integral part of the housing 10 during a stamping and deep drawing forming process. The flange 21 has a single outwardly extending protrusion 23 and the flange 22 has two such protrusions 23. The three protrusions 23 are equi-angularly spaced around the open end 12 of the metal housing 10 and are each provided with an aperture 24 for a purpose which will become apparent hereinafter.

The plastic inner part 16 of the end cap 15 has two upstanding terminal insulating posts 37 which pass through apertures 38 in the metal outer part 20 of the end cap 15.

Figure 4:
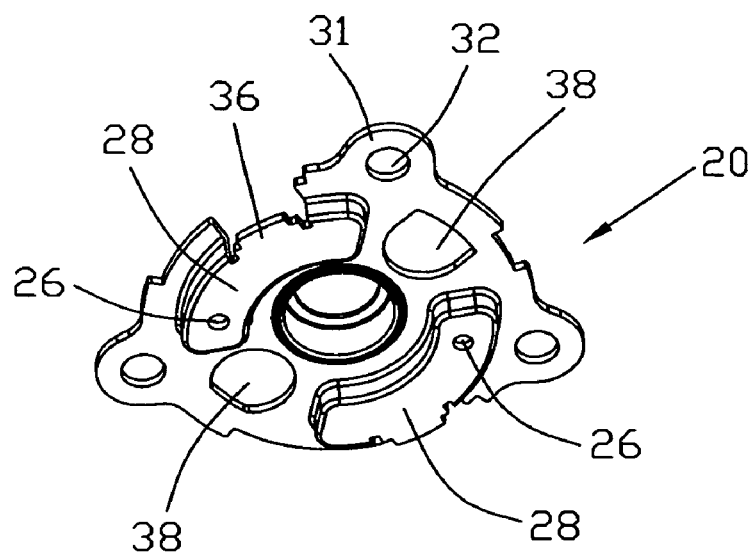
FIG. 4 is a perspective view of the metal part of the end cap shown in FIGS. 1 and 2.

The plastic inner part 16 is fixed to the metal outer part 20 by two small posts 25 formed integrally as a part of the inner part and passing through apertures 26 (see FIG. 4) in the metal outer part 20. The posts 25 are plastically deformed e.g., by hot pressing, to fix the inner and outer parts together. Alternatively, the posts 25 are a press fit in aperture 26.

The metal outer part 20 of the end cap 15 supports a further bearing 27 for the rotor 14 and is provided with two arcuate depressions 28 which bear against the top surface of the plastic inner part 16 and which are a press fit in the open end of the metal housing 10 to set the position of the end cap 15 relative to the housing 10.

The metal outer part 20 of the end cap 15 also has two portions 29 and 30 which extend over the flanges 21 and 22 of the housing 10, respectively. The portion 29 has a single outwardly extending protrusion 31 and the portion 30 has two such protrusions 31. These protrusions 31 are, like the protrusions 23, equi-angularly spaced about the metal outer part 20 of the end cap 15 and are each provided with an aperture 32 which aligns with a corresponding aperture 24 in the protrusions 23 of the housing 10.

Figure 2:
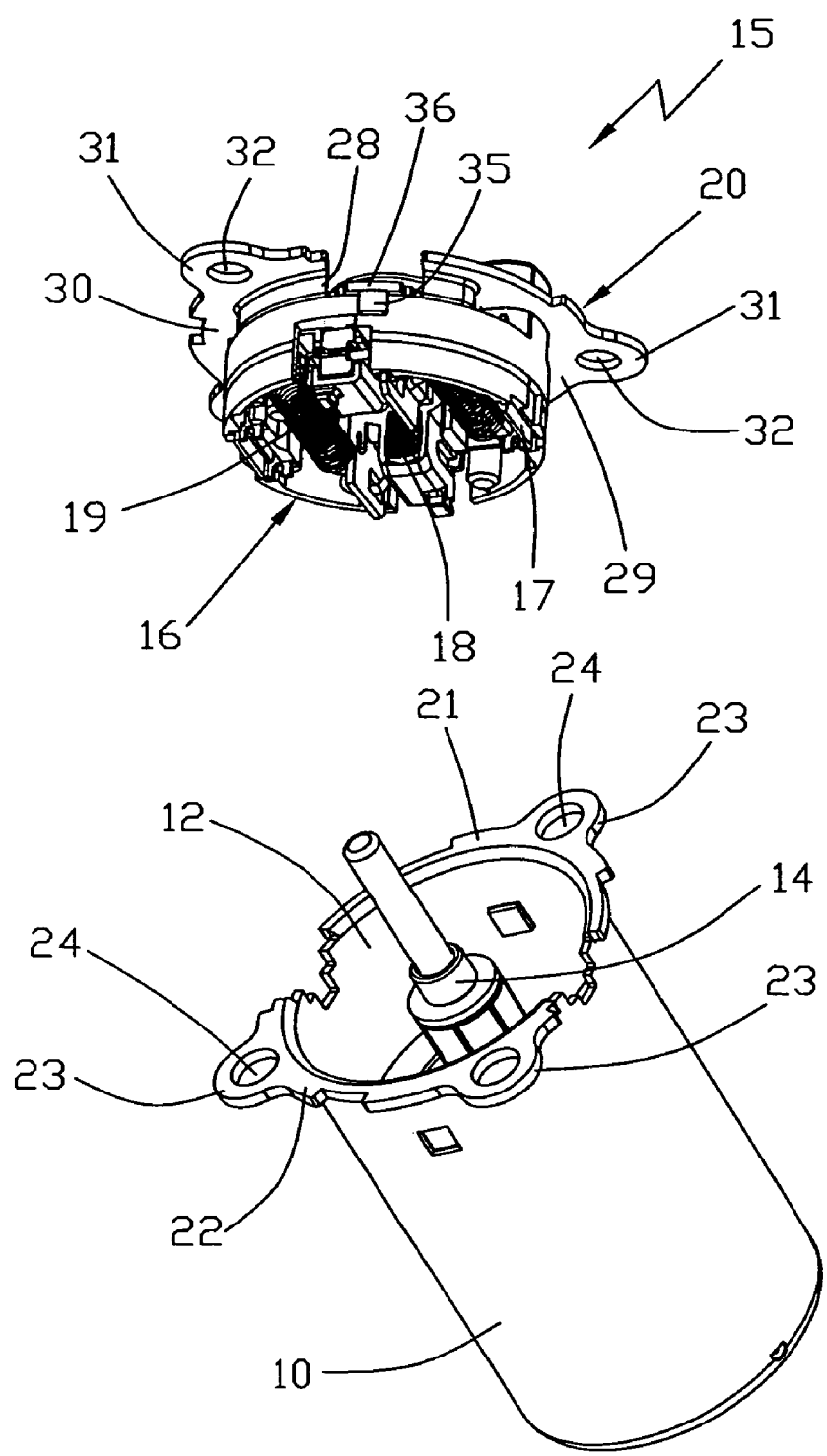
FIG. 2 is a perspective, exploded, view of the motor shown in FIG. 1.
Figure 3:
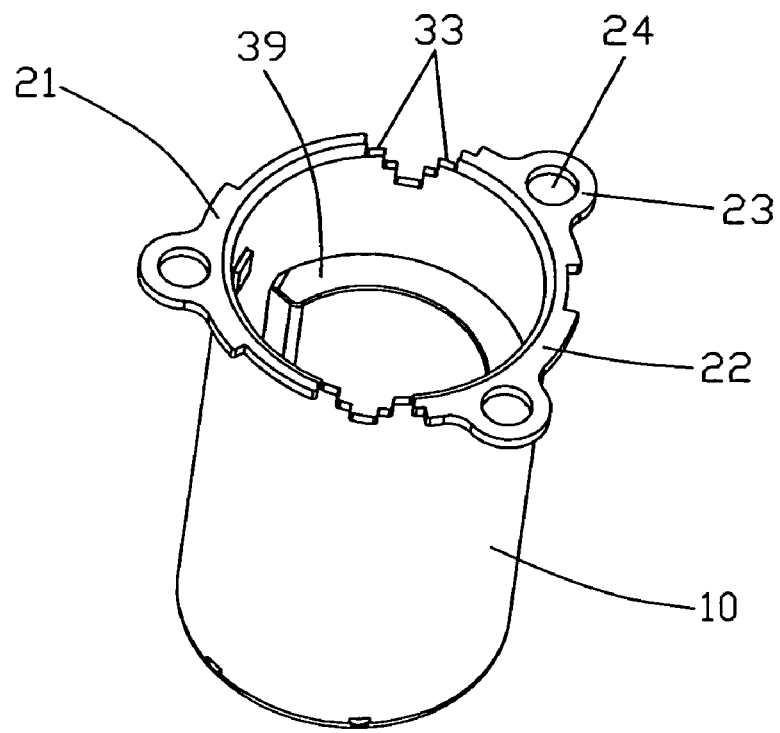
FIG. 3 is a perspective view of the housing of the motor shown in FIGS. 1 and 2 with the end cap removed.

The metal housing 10 is crimped to the metal outer part 20 of the end cap 15 at 33 to fix the entire end cap 15 to the housing 10. The crimping is a standard crimping process. As shown in FIGS. 1 and 2, the housing has two cut-out recesses 34 which receive a respective (square) projection 35 formed on the periphery of the plastic part 16. The recesses 34 also receive a finger 36 from the metal outer part 20. The edge of the housing 10 at 33 is deformed over the metal outer part 20 to hold the metal outer part 20 to the housing 10 and thereby also trapping the plastic part 16 to reduce/relieve stress on the plastic part connection.

The recesses 34 and projections 35 and fingers 36 are preferably arranged so that the end cap 15 and housing 10 only go together in one way by appropriate orientation or dimensions of the recesses 34, projections 35, and fingers 36. As shown, one recess is deeper than the other.

The motor is fitted to the aforesaid customer's unit by inserting the housing 10 into a cavity or recess defined by the body of the throttle control unit and bolting the motor to the body by threaded fasteners extending through the apertures 24 and 32 and engaging with the body of the customer's unit. The flanges 21 and 22 of the housing 10 are thus trapped between the portions 29 and 30 and the body of the customer's unit thus preventing the housing 10 coming free.

The embodiment described above is given by way of example only and various modifications will be apparent to persons skilled in the art without departing from the scope of the invention as defined by the appended claims. For example, the can-like metal housing 10 may have a single flange (which may or may not be endless) instead of flanges 21 and 22 and the metal outer part 20 of the end cap 15 may have a single portion (which may or may not be endless) instead of portions 29 and 30.

The invention claimed is:

1. An electric motor comprising:
    a can-like metal housing having one or more outwardly extending flanges and an end cap closing the open end of the housing, the end cap comprising a plastic inner part which fits within the open end of the housing and which supports motor terminals and brush gear for the motor and a metal outer part which has a portion or portions extending over the flange or flanges of the housing, said flange(s) of the metal housing and said portion(s) of the metal outer part of the end cap each having a plurality of apertures for receiving fastening members for mounting the motor, and wherein the metal outer part of the end cap has at least two arcuate depressions which are press fit in the open end of the can-like housing.

2. The electric motor of claim 1, wherein the plastic inner part of the end cap is fixed to the metal outer part of the end cap by two plastic posts integral with the plastic inner part and passing through apertures in the metal outer part.

3. The electric motor of claim 1, wherein the can-like housing and the metal outer part of the end cap are crimped together.

4. The electric motor of claim 1, wherein the flange(s) is/are integral with the metal housing.

5. The electric motor of claim 1, wherein the plastic inner part of the end cap supports one or more suppression elements.

6. The electric motor of claim 1, wherein the motor is a PMDC micromotor.

7. An electronic throttle control unit comprising a body having a recess and the electric motor of claim 1 fitted to the unit by fastening members extending through the apertures in said flange(s) of the metal housing and said portion(s) of the metal outer part of the end cap and engaging with the body and with the can-like metal housing extending into the recess in the body.

8. The electronic throttle control unit of claim 7, wherein the fastening members are in the form of threaded bolts.

* * * * *